United States Patent [19]
Smith

[11] 3,858,555
[45] Jan. 7, 1975

[54] COLLAPSIBLE WEANING PEN FOR ANIMALS

[76] Inventor: Pleasant R. Smith, 69 Drakes Summit Dr., Pont Reyes Station, Calif. 94956

[22] Filed: Dec. 7, 1973

[21] Appl. No.: 422,768

[52] U.S. Cl. .................................. 119/20, 119/27
[51] Int. Cl. ............................................. A01k 1/02
[58] Field of Search .............. 119/20, 27, 19, 18, 16

[56] References Cited
UNITED STATES PATENTS

| | | | |
|---|---|---|---|
| 2,712,677 | 7/1955 | Hyde | 119/16 X |
| 3,105,462 | 10/1963 | Miller | 119/20 |
| 3,541,994 | 11/1970 | Meng et al. | 119/20 |

*Primary Examiner*—Hugh R. Chamblee
*Attorney, Agent, or Firm*—Stanley Bialos

[57] ABSTRACT

A weaning pen particularly for calfs comprises at least two pen sections, opposite side walls, opposite front and rear walls, and a central partition forming the pen sections. The walls are formed of removable panels; and opposite side walls are pivotedly connected to a floor structure to enable the pen to be collapsed when certain panels are removed. A pair of detachable triangular skids supports the pen with the floor structure above the ground or floor; and the floor structure is foraminous, being desirably of expanded metal comfortable to the animal.

7 Claims, 6 Drawing Figures

Patented Jan. 7, 1975

Patented Jan. 7, 1975

COLLAPSIBLE WEANING PEN FOR ANIMALS

BACKGROUND OF THE INVENTION

Weaning pens are well known, for the feeding and caring of farm animals, as is exemplified in the Patent to Wittern et al., U.S. Pat. No. 3,738,325, dated June 12, 1973. With respect to newly born calfs, it is customary to take them away from milk producing cows within a short time after the first feeding, and to house them in pens wherein the calfs may be cared for and fed.

SUMMARY AND OBJECTS OF THE INVENTION

Summarizing the invention hereof, it comprises a weaning pen composed of at least two pen sections. A foraminous floor structure is provided, preferably of expanded metal comfortable to the calf's feet, which is secured to a substantially rectangular floor frame. Front and rear walls are formed of panels which are removably mounted so that they may be readily assembled, or detached when desired for cleaning purposes, and the central partition is also removably mounted. The front and rear walls are pivotedly connected to the floor structure so that they may be collapsed when removably connected side wall panels between the front and rear walls are removed.

Such pivotal connections are arranged so that they are offset with respect to each other to enable one of the front or rear sides to be folded substantially flat over the other side when the opposite side wall panels are removed. Skids, advantageously of triangular shape are secured to opposite side walls to elevate the floor above the ground or other surface upon which the pen may be supported. In this connection, the skids are removed when the front and rear walls are collapsed.

From the preceeding, it is seen that the invention has as it objects, among others, the provision of a weaning pen which is of simple and economical construction, is composed of simple parts which are readily detachable for cleaning or transportation purposes, and which may be collapsed into a compact package assembly for transportation from one place to another. Other objects of the invention will become apparent from the following more detailed description and accompaning drawings, in which.

DETAILED DESCRIPTION

Figure 1:
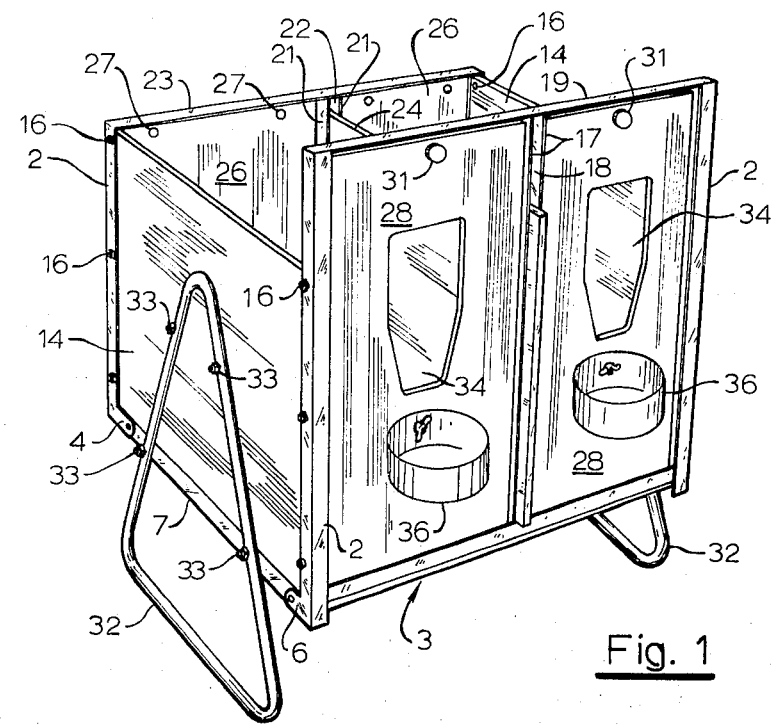
FIG. 1 is an isometric view of the set up pen.
Figure 5:
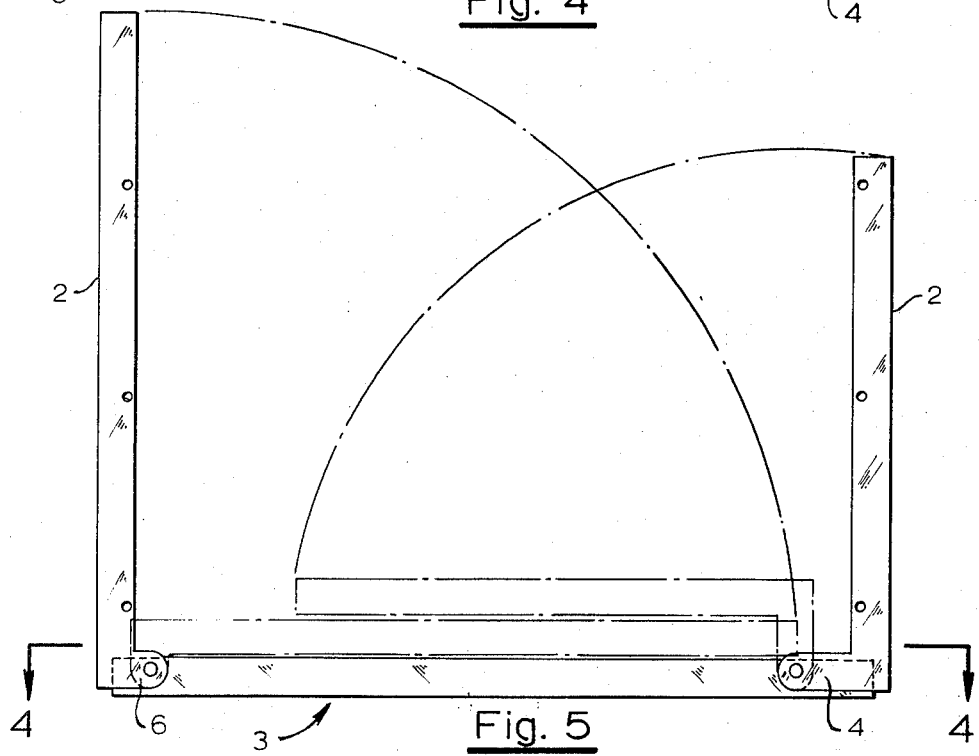
FIG. 5 is a schematic side elevation illustrating pivotal connections for the front and rear walls, and in phantom lines the folded position of these walls.

Referring to FIG. 1, the pen comprises upright supports 2 at the four corners of the bottom 3 of the pen, desirably in the form of angle irons. The front supports 2 are pivotally connected to the bottom and are longer than the rear supports 2 which are also pivotally connected to the bottom so that they may be pivoted inwardly to overlie each other when certain of the wall panels to be described are removed. The pivotal connection of each rear support 2 is by means of a leg 4 which is longer than leg 6 connected to each front support 2 as can be seen from FIG. 5. Thus, the pivotal connections are offset relative to each other so that each of the sides connected to the supports may be folded substantially flat relative to the other.

Figure 4:
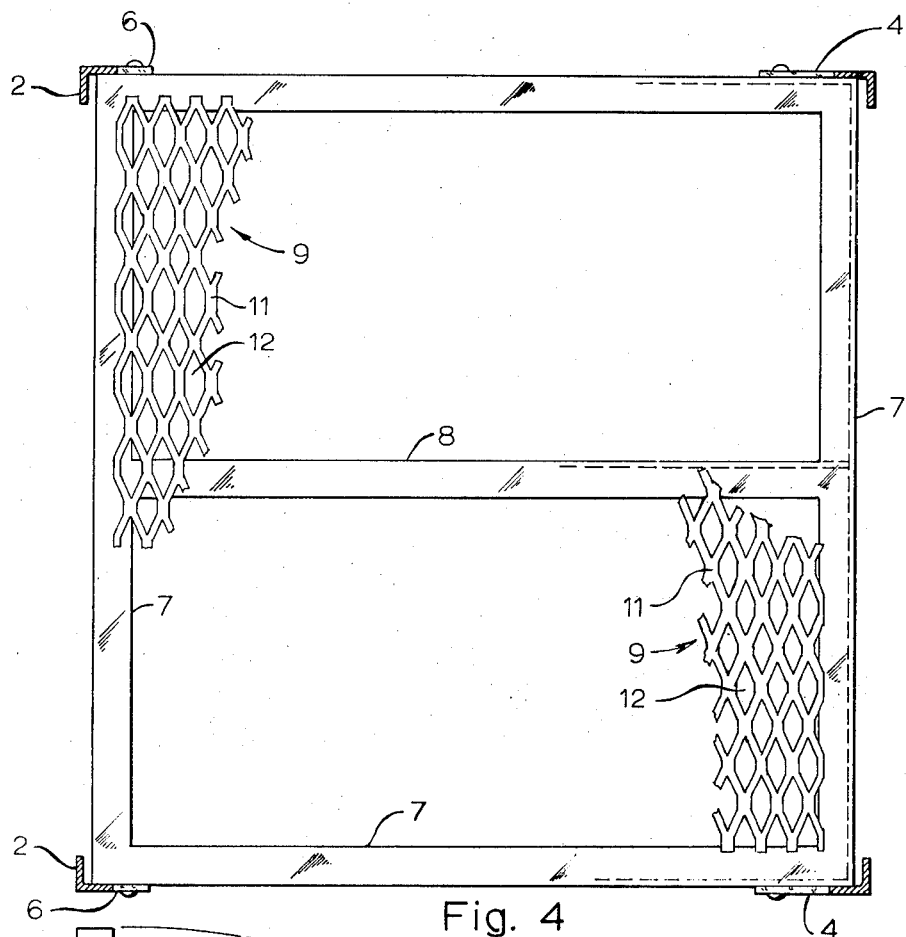
FIG. 4 is a plan view of the floor structure illustrating in horizontal section upright supports at the corners of the floor structure; the plane of the section being illustrated by line 4—4 in FIG. 5.

The floor structure as can be seen from FIG. 4 is substantially rectangularly shaped, and comprises side frame members, desirably angle irons 7 secured together, preferably by welding, and a central frame member 8 secured to opposite side members 7. Secured to the floor frame, desirably by welding, is a foraminous floor 9 which is advantageously of expanded metal having substantially flat upper edges 11 and relatively wide openings 12 through which excreta from the animal may readily pass. The expanded metal floor 9 is rigid, and because of the relatively flat upper edges 11 thereof, it provides a comfortable support for the animal's feet.

A side wall panel 14 desirably of imperforate sheet material, such as plywood, is detachably secured to the upright supports 2 at each side of the pen by means of bolts and nuts 16. A pair of central upright supports 17, forming a guideway 18 is secured to the floor frame at the front of the pen and extends substantially the height of the front supports 2; and a cross brace 19 is secured rigidly to the upright supports 2 at the front end to the tops of upright supports 17.

Similarly a pair of central upright supports 21 providing a guideway 22 therebetween is secured to the rear of the pen and a rear cross brace 23 is secured to the tops of the rear upright supports 2 and to the tops of central upright supports 21. Supports 17, 21 and braces 19 and 23 are also advantageously angle irons.

Guideways 18 and 22 provide means for removably receiving central partition panel 24 which may be detachably connected at each end, to the central supports 21 and 22 but which may be removed endwise when the central partition 24 is disconnected. Such central partition divides the pen into two pen sections or units. Additional pen sections may be provided in a similar manner.

Figure 3:
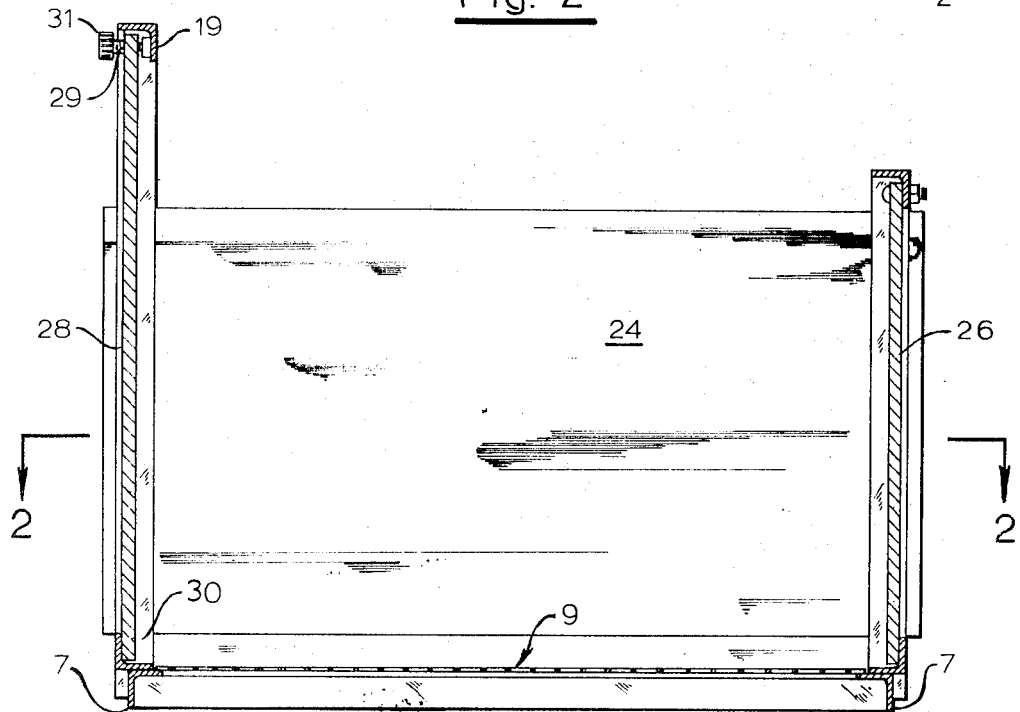
FIG. 3 is a vertical section taken in a plane indicated by line 3—3 in FIG. 2.

A rear wall structure is provided by means of rear panels 26 which are detachably connected to rear supports 2, and cross brace 23 by means of bolts and nuts 27. The front wall panel structure comprises panels 28, the lower ends of which, as can be seen from FIG. 3, are received in a recesses 30 formed adjacent a side frame member 7. Each panel 28 is detachably connected to front cross brace 19 by means of a screw 29 secured to the cross brace and passing through a hole through the panel. A nut 31 secures panel 28. By removing nut 31, which may be a wing nut, the associated front panel 28 may be lifted off of the pen.

For supporting the floor of the pen in elevated position above a support surface for the pen, such as the ground or a floor, skids 32 are provided which are detachably connected at the sides of the pen. These skids are advantageously of triangular shape. As can be seen from FIG. 1, each skid is detachably connected by bolts and nuts 33 to a side frame member 7 and to a side wall panel 14.

Each front panel 28 is provided with a suitable opening 34 through which the head of the animal may be extended for access to a feed trough 36 detachably connected to the panel under opening 34. The increased height of the front wall structure with reference to the rear wall structure provides ample space for such opening.

Figure 6:
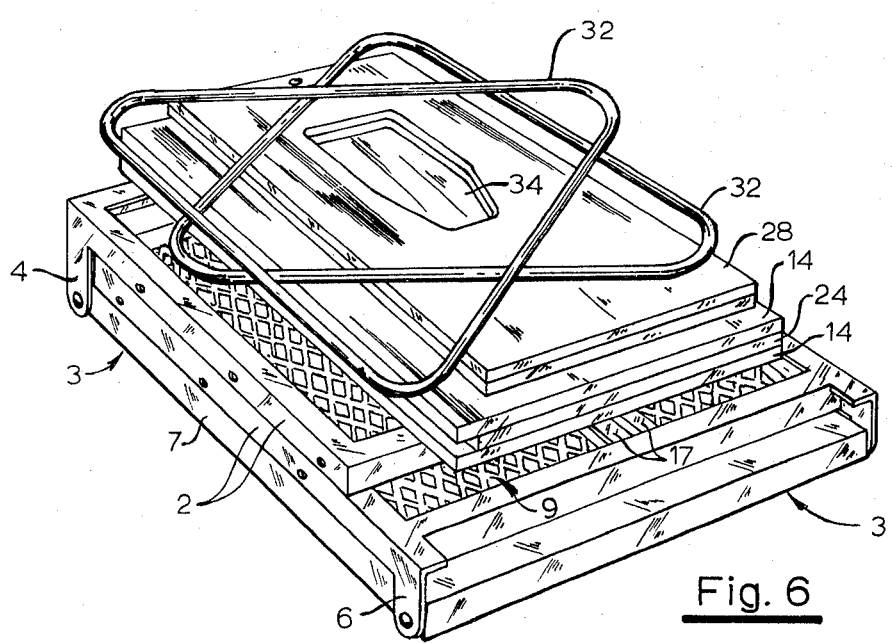
FIG. 6 is an isometric view illustrating a package assembly of components of the pen.
Figure 2:
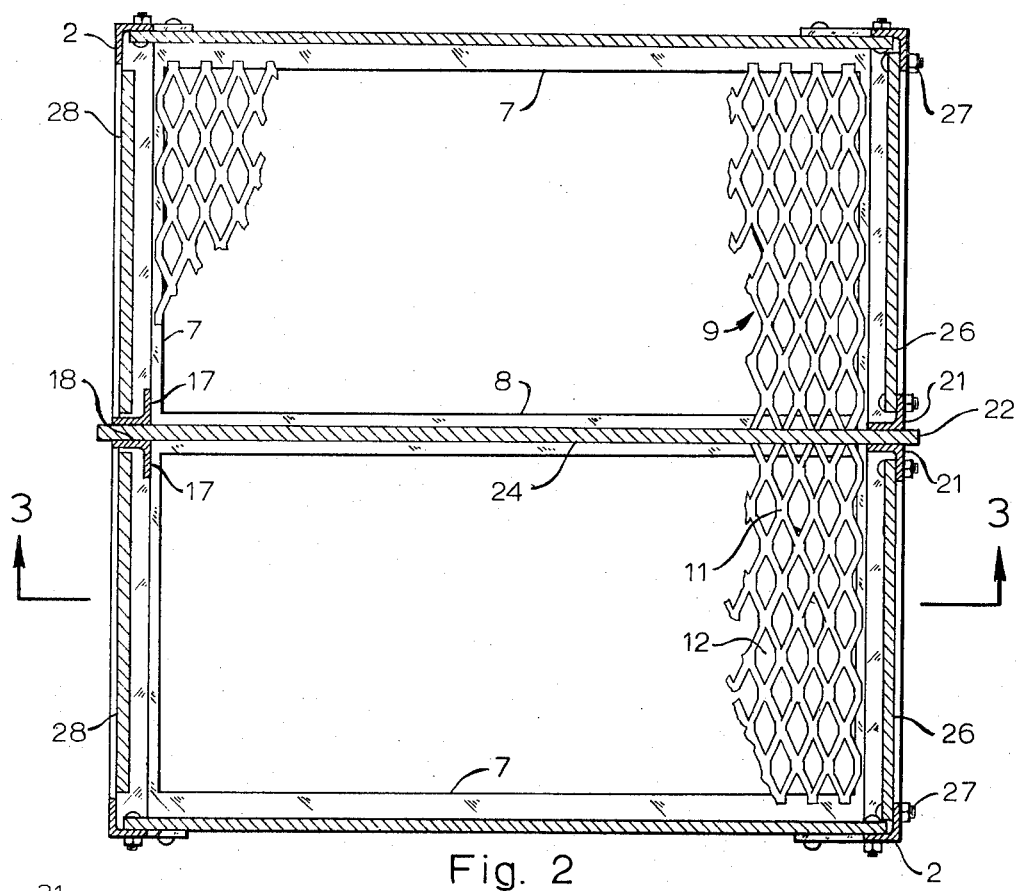
FIG. 2 is a horizontal section taken in a plane indicated by line 2—2 in FIG. 3.

Initially, the components of the pen may be packaged in a compact assembly as shown in FIG. 6, and then assembled. When the pen is transported a long distance from one place to another it may be readily disassembled into such package to facilitate transportation. For shorter distances, the skids enable the pen to be pushed or pulled (skidded) over the ground from one place to another. Inasmuch as all of the panels and skids are removably mounted, they may be readily cleaned when disassembled to maintain sanitary conditions in the pen. In disassembling the pen components, all of the panels need not be removed. It is only necessary to detach and remove skids 32, detach and remove side panels 14, and remove central partition panel 24 endwise. With these components detached, the front and rear wall structures may be pivoted over the floor structure.

Although the pen may be of any suitable size, the following is a typical example of suitable dimensions for housing newly born calfs. The pen is approximately 4 feet 8 inches square so that each pen section is about 2 feet 4 inches wide, about 3 feet 6 inches high at the front, and about 2 feet 7 inches high at the rear and at the sides. The excreta discharge openings 12 in the expanded metal floor 9 are diamond shaped as is usual in expanded metal, with a lengthwise dimension of approximately 1 ¾ inch and a maximum width of about five-eighth inch; the width of the substantially flat top edges 11 being about three-sixteenth of an inch. These dimensions are merely given by way of example and are not critical.

I claim:

1. A collapsible animal weaning pen comprising a substantially rectangular floor frame, a foraminous floor secured to said frame, a pair of upright supports connected at the respective corners of the frame at the front side thereof to pivot over the frame, and a second pair of upright supports connected to the respective corners at the rear side of the frame to pivot over the frame, a side wall panel detachably connected to the corner supports at each side of the frame between the front and rear thereof, a support skid detachably connected to each side of the frame for supporting the floor of the pen in elevated position above a supporting surface, a panel structure forming the front side of the frame, a panel structure forming the rear side of the frame, and at least one removably mounted partition panel between the side wall panels to form at least two pen sections positioned side by side, the pen being collapsible to form a compact assembly when removable panels and the skids are removed and placed over the assembly.

2. The pen of claim 1 wherein each of the skids is of substantially triangular shape.

3. The pen of claim 1 wherein said partition panel is retained between a pair of upright supports secured to said frame at both the front and the rear sides between said corner supports, and a cross brace is connected to the corner supports and to the pair of upright supports at both the front and the rear.

4. The pen of claim 3 wherein the front side of the pen extends above the rear side, and a feed opening is provided in the front panel structure for each pen section.

5. The pen of claim 1 wherein the wall panels are of imperforate sheet material, and the foraminous floor is of expanded metal comfortable to the animal.

6. The pen of claim 5 wherein the wall panels are of plywood.

7. The pen of claim 1 wherein the pivotal connections of the front and rear sides of the frame are offset relative to each other to enable each of said sides to be folded substantially flat relative to the other.

* * * * *